(12) United States Patent
Hsu et al.

(10) Patent No.: US 10,914,977 B1
(45) Date of Patent: Feb. 9, 2021

(54) DISPLAY PANEL, DISPLAY SCREEN, TERMINAL DEVICE, AND MANUFACTURING METHOD OF DISPLAY PANEL

(71) Applicant: BEIJING XIAOMI MOBILE SOFTWARE CO., LTD., Beijing (CN)

(72) Inventors: Che-jui Hsu, Beijing (CN); Chih-jen Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/891,754

(22) Filed: Jun. 3, 2020

(30) Foreign Application Priority Data

Dec. 16, 2019 (CN) .......................... 2019 1 1293199

(51) Int. Cl.
*G02F 1/1333* (2006.01)
*G02F 1/1335* (2006.01)
(52) U.S. Cl.
CPC .... *G02F 1/13338* (2013.01); *G02F 1/133512* (2013.01); *G02F 1/133553* (2013.01); *G02F 1/133555* (2013.01); *G02F 1/133357* (2021.01)
(58) Field of Classification Search
None
See application file for complete search history.

(56) References Cited

U.S. PATENT DOCUMENTS

2010/0110350 A1* 5/2010 Katoh .................. H01L 31/101
349/110

FOREIGN PATENT DOCUMENTS

CN 109934138 A 6/2019
CN 110441944 A 11/2019

OTHER PUBLICATIONS

Extended European Search report in Application No. 20182179.0, dated Oct. 9, 2020.

* cited by examiner

*Primary Examiner* — Phu Vu
(74) *Attorney, Agent, or Firm* — Syncoda LLC; Feng Ma (57) ABSTRACT

A display panel includes a first substrate, a second substrate disposed opposing the first substrate, a first transparent layer, a first light shield layer, and a photosensitive element layer located between the first substrate and the second substrate. The first transparent layer, the first light shield layer, and the photosensitive element layer are sequentially disposed along a direction from the first substrate to the second substrate. The first transparent layer includes a plurality of protrusions extending toward the first substrate. The first light shield layer includes a plurality of first openings, and the photosensitive element layer includes a plurality of photosensitive elements for acquiring a fingerprint image. The protrusions, the first openings, and the photosensitive elements have one-to-one correspondence, and have at least partially overlapped orthographic projections on the second substrate.

20 Claims, 5 Drawing Sheets

DISPLAY PANEL, DISPLAY SCREEN, TERMINAL DEVICE, AND MANUFACTURING METHOD OF DISPLAY PANEL

CROSS-REFERENCE TO RELATED APPLICATION

This application claims priority to Chinese Patent Application No. 201911293199.0 filed on Dec. 16, 2019, the disclosure of which is hereby incorporated by reference in its entirety.

BACKGROUND

With the development of mobile phones, tablet computers and other terminal devices, full-screen devices have become popular. To achieve a near 100% full screen, influence of elements disposed on the front of a terminal device may need to be reduced. Taking a fingerprint recognition unit as an example, it also occupies a large front area while providing a safe and fast operation experience, which affects the screen ratio. In this regard, some manufacturers have proposed to dispose the fingerprint recognition unit under the screen, which will not occupy the front area of the terminal device while providing the fingerprint recognition function, and be conducive to ensure a higher screen ratio.

SUMMARY

The present disclosure generally relates to the field of display, and more specifically, to a display panel, a display screen, a terminal device, and a manufacturing method of display panel.

Various embodiments of the present disclosure provide a display panel, including a first substrate, a second substrate disposed opposing the first substrate, a first transparent layer, a first light shield layer, and a photosensitive element layer which are located between the first substrate and the second substrate, the first transparent layer, the first light shield layer, and the photosensitive element layer being sequentially disposed along a direction from the first substrate to the second substrate; the first transparent layer includes a plurality of protrusions extending toward the first substrate, the first light shield layer includes a plurality of first openings, and the photosensitive element layer includes a plurality of photosensitive elements for acquiring a fingerprint image; the protrusions, the first openings, and the photosensitive elements correspond one by one, and orthographic projections of the protrusions, the first openings, and the photosensitive elements on the second substrate are at least partially overlapped.

In some embodiments, an orthographic projection of the protrusions on the second substrate is larger than an orthographic projection of the first openings on the second substrate, and covers an orthographic projection of the first openings on the second substrate.

In some embodiments, an optical focus of the protrusions is located within the first openings.

In some embodiments, the display panel includes a second transparent layer disposed between the first substrate and the first transparent layer, the second transparent layer is provided with a plurality of depressions, and the protrusions are located within the depressions.

In some embodiments, a refractive index of the first transparent layer is greater than a refractive index of the second transparent layer.

In some embodiments, the display panel includes a second light shield layer disposed between the first substrate and the second transparent layer, the second light shield layer is provided with a plurality of second openings, orthographic projections of the second openings, the protrusions, the first openings, and the photosensitive elements on the second substrate are at least partially overlapped.

In some embodiments, the display panel includes a color filter layer and a liquid crystal layer, and the filter layer is disposed between the second light shield layer and the second transparent layer; and the liquid crystal layer is disposed between the first transparent layer and the first light shield layer; or the liquid crystal layer is disposed between the first transparent layer and the color filter layer.

In some embodiments, an orthographic projection of the second openings on the second substrate is not smaller than an orthographic projection of the protrusions on the second substrate, and covers an orthographic projection of the protrusions on the second substrate.

In some embodiments, the first transparent layer is a photoresist layer, and the second transparent layer is a planarization layer.

In another aspect, various embodiments of the present disclosure further provide a display screen, including a backlight module and the display panel as described above, wherein the display panel covers the backlight module.

In yet another aspect, various embodiments of the present disclosure further provide a terminal device, including the display screen as described above.

In addition, the present disclosure further provides a manufacturing method of a display panel, including: providing a first substrate and a second substrate; forming sequentially a second light shield layer, a color filter layer, a second transparent layer, and a first transparent layer on a side of the first substrate close to the second substrate; forming sequentially a photosensitive element layer and a first light shield layer on a side of the second substrate close to the first substrate; setting the first substrate and the second substrate in an opposite and aligned way, and forming a gap between the first transparent layer and the first light shield layer; disposing a liquid crystal layer in the gap; wherein the first transparent layer includes a plurality of protrusions extending toward the first light shield layer, the first light shield layer includes a plurality of first openings, the photosensitive element layer includes a plurality of photosensitive elements; projections of the protrusions, the first openings, and the photosensitive elements on the second substrate are at least partially overlapped.

In some embodiments, the second transparent layer is a photoresist layer, and the second transparent layer is formed through masking by a gray tone mask.

It is to be understood that the above general descriptions and detailed descriptions below are merely exemplary and explanatory and not intended to limit the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used herein is for the purpose of describing particular implementations only, not intended to be limiting. Unless otherwise defined, the technical or scientific terms used in the present disclosure shall have the common meanings understood by those with ordinary skills in the art. The terms "first," "second," and the like used in the description and the claims of the present disclosure do not indicate any order, quantity, or priority, but are only used to distinguish different components. Also, similar words such as "a" or "one" do not indicate a limit on quantity, but rather indicate that there is at least one. And "multiple" or "several" means two or more. Unless otherwise stated, similar words such as "front," "rear," "lower" and/or "upper" are merely for convenience of explanation, not limited to one position or one spatial orientation. Similar words such as "include" or "comprise" mean that the elements or articles before "include" or "comprise" encompass the elements or articles listed after "include" or "comprise" and their equivalents, without excluding other elements or objects. Words such as "connected" or "connecting" are not limited to physical or mechanical connections, but can include electrical connections, regardless of direct or indirect connections. The singular forms "a," "said," and "the" used in this specification and the claims of the present disclosure are intended to include the plural forms as well, unless the context clearly indicates otherwise. It should also be understood that the term "and/or" as used herein refers to and includes any or all possible combinations of one or more of the associated listed items.

Figure 1:
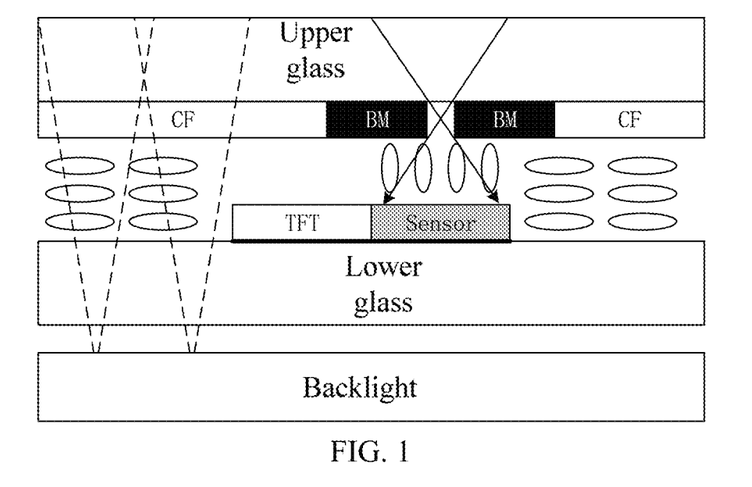
FIG. 1 is a schematic structural diagram of a display screen with fingerprint recognition under the screen.
Figure 2:
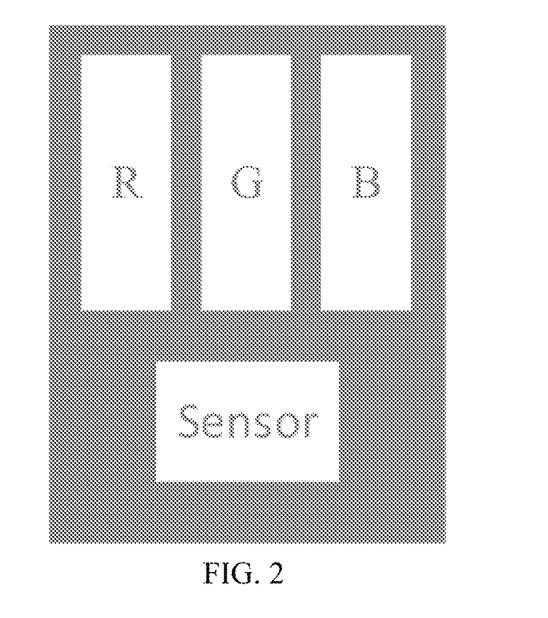
FIG. 2 is a front view of a pixel region of the display screen shown in FIG. 1.
Figure 3:
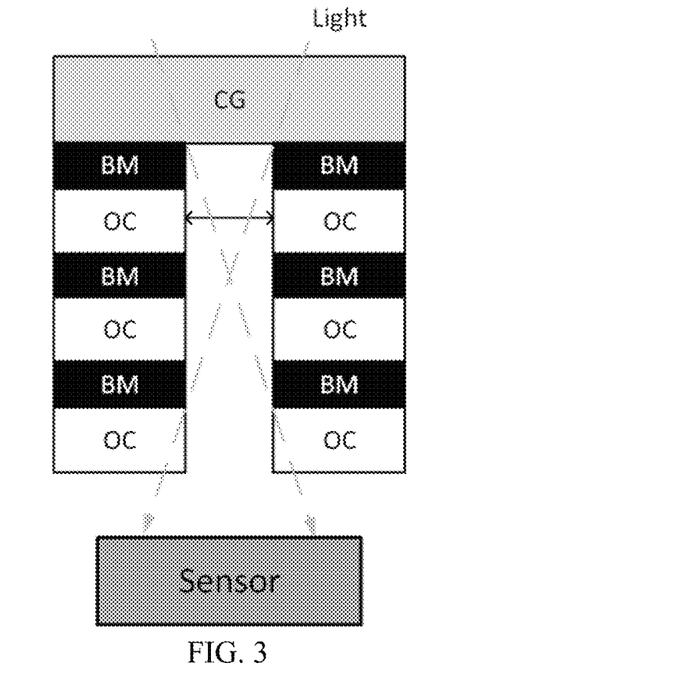
FIG. 3 is a side view of a pixel region of the display screen shown in FIG. 1.

FIG. 1 shows one of the implementation schemes, wherein the collimated optical path is implemented on the black matrix (BM) of the upper glass. FIG. 2 and FIG. 3 are a top view and a side view, respectively, of pixel regions corresponding to the structure illustrated in FIG. 1.

As shown in FIG. 1, after the backlight passes through the entire LCD (liquid crystal) module path to the upper glass, it is reflected by the fingerprint on the upper glass to form the incident light, the collimation mechanism composed of the BM region is used to block unwanted stray light, illumination is formed on the sensor, and a fingerprint image is generated by the sensor based on the light. The BM and the sensor are shown in FIG. 2, and the composition of the collimator can be referred to FIG. 3, that is, a multi-layer BM and an over coating (OC) are used to form a collimation scheme with a high aspect ratio. However, due to the current process capability, a collimation degree of the collimation scheme made by BM and OC cannot meet requirements. Furthermore, in this scheme, the sensor can only receive small-angle light above the light receiving aperture, and the amount of incoming light is relatively small, which affects a success rate of fingerprint acquisition.

Figure 4:
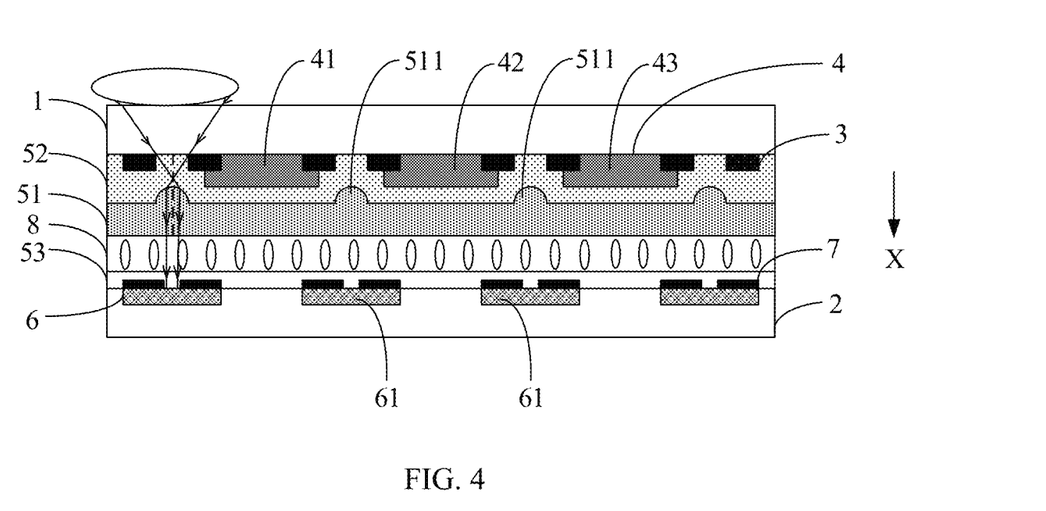
FIG. 4 is a schematic structural diagram of an implementation of a display panel according to some embodiments of the present disclosure.
Figure 5:
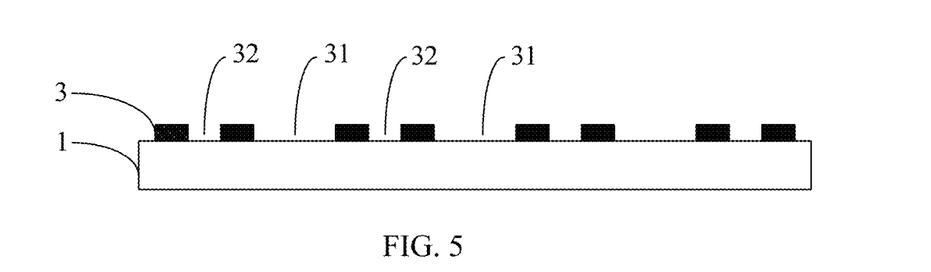
FIG. 5 is a schematic structural diagram of forming a second light shield layer on a first substrate.

In connection with FIG. 4, the display panel in this implementation is applied to a display screen and a terminal device. The display panel includes a first substrate 1, a second substrate 2 disposed opposing the first substrate, and a first transparent layer 51, a first light shield layer 7, and a photosensitive element layer 6 which are located between the first substrate 1 and the second substrate 2, the first transparent layer 51, the first light shield layer 7, and the photosensitive element layer 6 are sequentially disposed along a first direction X, and the first direction X is a direction from the first substrate 1 to the second substrate 2. The first transparent layer 51 includes a plurality of protrusions 511 extending toward the first substrate 1, the first light shield layer 7 includes a plurality of first openings 72 (for their reference signs, please refer to FIG. 10), and the photosensitive element layer 6 includes a plurality of photosensitive elements 61 for acquiring a fingerprint image. Projections of the protrusions 511, the first openings 72, and the photosensitive elements 61 on the second substrate 2 are at least partially overlapped. The protrusions 511 can be used as a convex lens, through which when a fingerprint detection light (which is usually the screen light reflected by the finger) passes, it is refracted, and the angle between the refracted light and the optical axis is reduced, according to the refractive principle of convex lens, thereby it is beneficial to improve the collimation degree of the light, and increase the effective light entering amount of the photosensitive units, such that the quality of the fingerprint image is improved, and the success rate of fingerprint acquisition is raised.

It should be noted that the understanding of the orthographic projection of the first openings 72 is similar to that of the orthographic projection of the protrusions 511 and the photosensitive elements 61, except that the orthographic projection of the protrusions 511 is dark, while the orthographic projection of the first openings 72 is bright. Since the first direction X is perpendicular to the first substrate 1 and the first substrate 2, the first openings 72, the protrusions 511, and the photosensitive elements 61 are at least partially overlapped in the first direction X from another perspective. The coincidence of the orthographic projections referred to hereafter can be similarly understood.

The display panel further includes a second light shield layer 3, a color filter layer 4, a second transparent layer 52, a liquid crystal layer 8, and a third transparent layer 53 which are disposed between the first substrate 1 and the second substrate 2. The first substrate 1, the second light shield layer 3, the color filter layer 4, the second transparent layer 52, the first transparent layer 51, the liquid crystal layer 8, the third transparent layer 53, the first light shield layer 7, the photosensitive element layer 6, and the second substrate 2 are sequentially disposed along the first direction X.

In connection with FIGS. 5 to 8, the second light shield layer 4 is formed on the first substrate 1 and is provided with second pixel openings 31 and second openings 32. It should be noted that "on" here only means that the second light shield layer 4 is located "above" during the manufacturing process, but in the final product form, the second light shield layer 4 is located below the first substrate 1, that is, the first substrate 1 and the second light shield layer 4 are arranged along the first direction X. The second openings 32 face the protrusions. In this implementation, a projection of the second openings 32 on the second substrate 2 coincides with a projection of the protrusions 511 on the second substrate 2, in other words, both of them have the same cross-sectional area. The light for fingerprint detection can enter the second transparent layer 52 through the second openings 32. In other implementations, the projection of the second openings 32 on the second substrate 2 is relatively large and covers the projection of the protrusions 511 on the second substrate 2.

Figure 6:
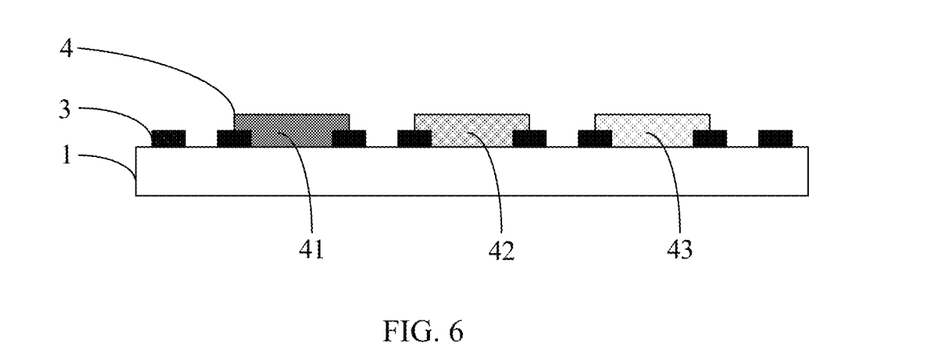
FIG. 6 is a schematic structural diagram of forming a color filter layer on the second light shield layer.

The color filter layer 4 is formed within the second pixel openings 31 and includes a red color resist (R) 41, a green color resist (G) 42, and a blue color resist (B) 43. The color filter layer 4 is used to filter the outgoing light of partial colors, so that the color of the light emitted from the display screen is more saturated.

Figure 7:
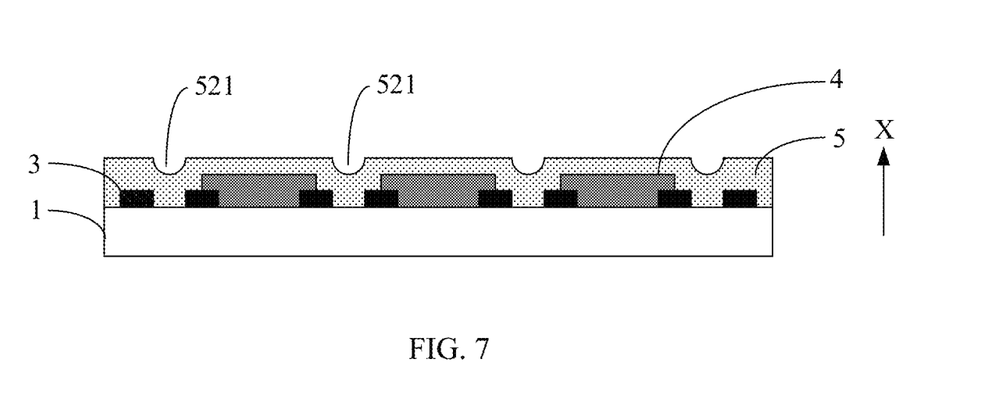
FIG. 7 is a schematic structural diagram of forming a second transparent layer on the color filter layer.
Figure 8:
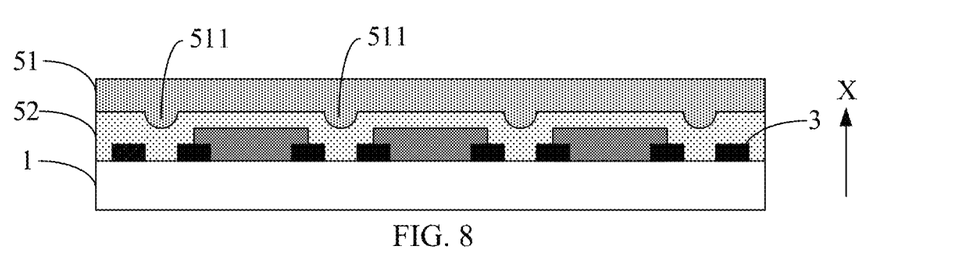
FIG. 8 is a schematic structural diagram of forming a first transparent layer on a second transparent layer.

The second transparent layer 52 and the first transparent layer 51 are arranged along the first direction X. During the manufacturing process, the first transparent layer 51 is located above the second transparent layer 52; in the final product form, the second transparent layer 52 is located above the first transparent layer 51. The third transparent layer 53 can be a planarization layer used to eliminate in-plane segment differences caused by patterns of different layers on the display device. The first transparent layer 51 and the third transparent layer 53 are used to prevent the liquid crystal layer 8 from flowing and contaminating other elements. In this implementation, a support pillar can be further provided to support the liquid crystal layer 8, and a frame sealant (not shown) can be used for sealing in a lateral direction (perpendicular to the first direction X) of the liquid crystal layer 8.

The second transparent layer 52 is provided with a plurality of depressions 521, and the first transparent layer 51 is provided with a plurality of protrusions 511 located within the depressions 521. In this implementation, the protrusions 511 have a hemispherical shape; and in other implementations, the protrusion 511 can have other convex shapes. In this implementation, the second transparent layer 52 is a photoresist, the first transparent layer 51 is a planarization layer, that is, the first transparent layer 51 not only serves as a collimated optical path, but also can eliminate in-plane segment differences. The protrusions 511 can be roughly regarded as a convex lens. The light is refracted when passing through the protrusions, and the refracted light approaches the optical axis of the convex lens (i.e., the protrusions 511), thereby improving the collimation degree of the light. As for the specific optical path, reference can be made to FIG. 4, wherein a straight line with an arrow represents light, an ellipse indicates a finger. Compared with the optical path in FIG. 1, the protrusions 511 can effectively collimate light, and also allow more light to be transmitted to the photosensitive element 61, thereby improving the success rate of fingerprint acquisition. Alternatively, the optical focus of the protrusions 511 is located within the first openings 72, so that most of the refracted fingerprint detection light can enter the first openings 72, and further increasing the light entering amount of the photosensitive element 61.

In some embodiments, a refractive index of the first transparent layer 51 is greater than a refractive index of the second transparent layer 52, so that a critical angle of the second transparent layer 52 (an incident angle when the refraction angle is 90 degrees, total reflection occurs to the light whose angle is larger than this angle) is smaller than a critical angle of the first transparent layer 51. This means that the second transparent layer 52 located above can allow that more light to be refracted after entering, and enter the first transparent layer 51. Therefore, providing the second transparent layer 52 is beneficial to increase the light entering amount of the first transparent layer 51, thereby improving the quality of the fingerprint image acquired by the photosensitive elements.

In some embodiments, an orthographic projection of the protrusions 511 on the second substrate 2 is larger than an orthographic projection of the first openings 72 on the second substrate 2 and covers an orthographic projection of the first openings 72 on the second substrate 2, in this way, more light is allowed to pass through the first openings 72, thereby ensuring that enough light can be incident on the photosensitive elements 60. From another perspective, the size of the first openings 72 is relatively small, so that the fingerprint detection light with an incident angle smaller than a predetermined value can be irradiated onto the photosensitive elements, and the collimation effect is further improved.

Figure 9:
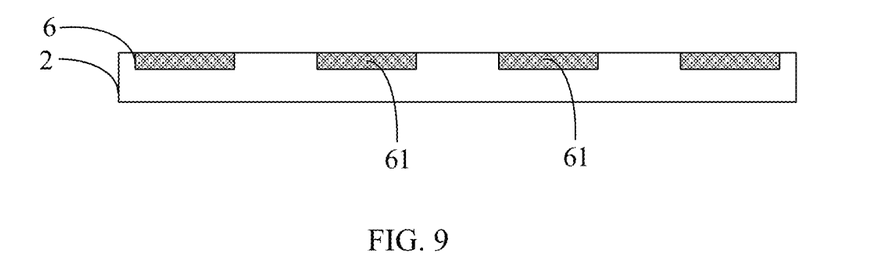
FIG. 9 is a schematic structural diagram of forming a photosensitive element layer on a first substrate.
Figure 10:
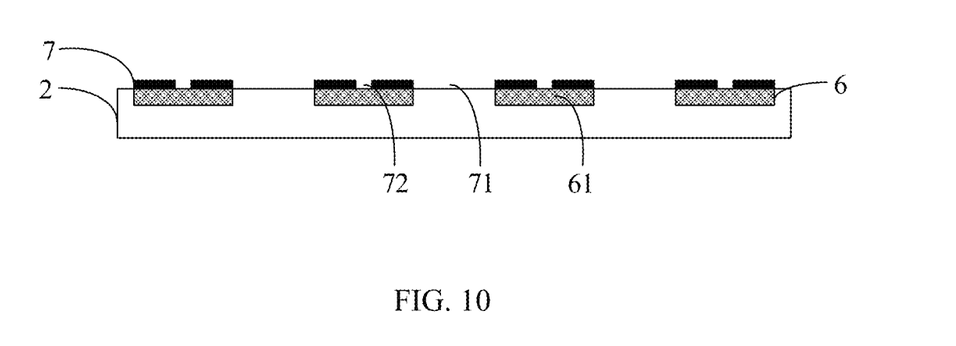
FIG. 10 is a schematic structural diagram of forming a first light shield layer on a photosensitive element layer.

In connection with FIGS. 9-10, the photosensitive element layer 6 is formed on the second substrate 2, and the first light shield layer 7 is formed on the photosensitive element layer 6.

Referring to FIGS. 5-8, the first light shield layer 7 is provided with a plurality of first pixel openings 71 and a plurality of the first openings 72. The first pixel openings 71 and the second pixel openings 31 correspond one by one, light generated by the backlight module can pass through the first pixel openings 71 and the second pixel openings 31. The photosensitive elements 61, the first openings 72, the protrusions 511, and the second openings 32 correspond one by one, and their orthographic projections on the second substrate 2 are at least partially overlapped, the reflected light reflected by the fingerprint passes through the second openings 32, the protrusions 511, and the first openings 72 sequentially, and is finally projected onto the photosensitive elements 61. The second openings 32, the protrusions 511, and the first openings 72 form a complete reflected light path, and the photosensitive elements 61 serve as an end point of the light path such that it is necessary to ensure that the four correspond one by one, and the fingerprint image cannot be effectively acquired without any one of them. The fingerprint detection light passes through the second openings 32, the protrusions 511, and the first openings 72 sequentially and is irradiated onto the photosensitive elements 61.

Herein, the fingerprint detection light is refracted at the protrusions 511, and the angle of the fingerprint detection light with the optical axis after the fingerprint detection light passes through the protrusions 511 is reduced, that is, the collimation degree of the fingerprint detection light is improved, and thus the effective light entering amount of the photosensitive elements is increased, thereby the quality of the fingerprint image is improved, and the success rate of fingerprint collection is raised. Because there is a corresponding photoresist material on the second substrate 2 side, the second transparent layer 52 and the first transparent layer 51 can also be fabricated after the photosensitive element layer 6 and the first light shield layer 7 are fabricated, that is, the second transparent layer 52 and the first transparent layer 51 are disposed below the liquid crystal layer 8. At this time, the liquid crystal layer 8 is disposed between the first transparent layer 51 and the second light shield layer 3. Similar to the foregoing implementations, the fingerprint detection light is refracted at the protrusions 511 of the transparent layer, the refracted fingerprint detection light is closer to the optical axis, in other words, the collimation degree of the fingerprint detection light is improved, and thus the effective light entering amount of the photosensitive elements is improved, thereby the quality of the fingerprint image is improved, and the success rate of fingerprint acquisition is raised.

Figure 11:
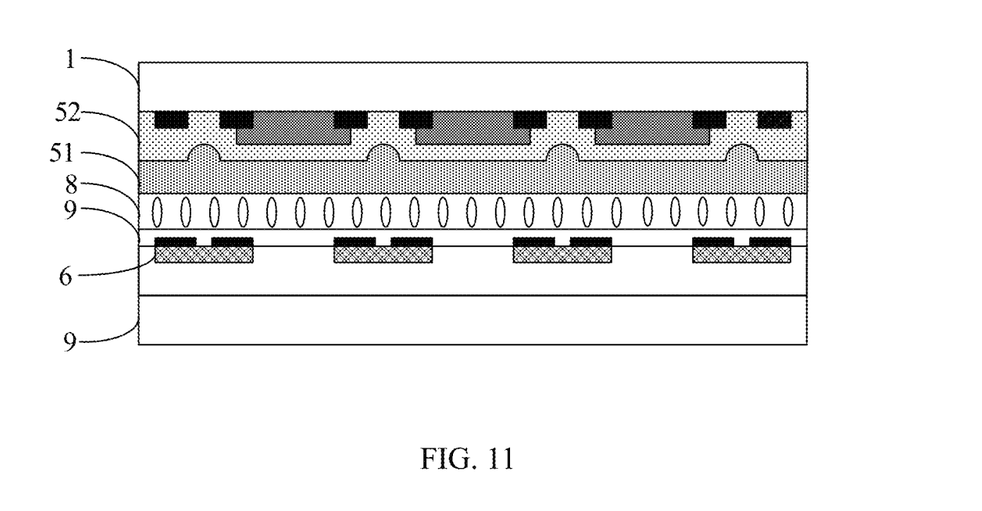
FIG. 11 is a schematic structural diagram of an implementation of a display screen according to some embodiments of the present disclosure.

In another aspect, various embodiments of the present disclosure further provide a display screen. In connection with FIG. 11, in this implementation, the display screen includes a backlight module 9 and the display panel according to any one of the foregoing implementations. The display panel covers the backlight module 9, the backlight module is used for providing display light for the display panel, and the display light can be used as fingerprint detection light after being reflected by the user's finger. Since the principle of the terminal device to solve the problem is similar to that of the display panel described above, details will not be repeated.

In yet another aspect, various embodiments of the present disclosure further provide a terminal device including the display screen, and the terminal device can be applied to products with a display function such as a mobile phone, a tablet computer, a display, a notebook computer, a digital photo frame, a navigator, and the like. Since the principle of the terminal device to solve the problem is similar to that of the display panel described above, details will not be repeated.

In addition, various embodiments of the present disclosure provide a manufacturing method of a display panel, which is used for manufacturing a display panel according to any one of the foregoing implementations. In connection with FIGS. 4 to 11, in this implementation, the manufacturing method includes:

Step S1: providing a first substrate 1 and a second substrate 2.

In this implementation, a glass material can be selected as the first substrate 1 and the second substrate 2.

Step S2: forming a second light shield layer 3, a color filter layer 4, a second transparent layer 52, and a first transparent layer 51 on a side of the first substrate 1 close to the second substrate 2 sequentially to form a color film substrate.

In this implementation, a black matrix can be selected as the second light shield layer 3, the filter layer 4 includes a red color resistant, a green color resistant, and a blue color resistant, the second transparent layer 52 is a photoresist layer, and the first transparent layer 51 is a planarization layer.

In some embodiments, the second transparent layer 52 is formed through masking by a gray tone mask.

Step S3: forming a photosensitive element layer 6 and a first light shield layer 7 sequentially on a side of the second substrate 2 close to the first substrate 1 to form an array substrate.

The photosensitive elements 61 of the photosensitive element layer 6 acquire a fingerprint image of the user according to the fingerprint detection light, the photosensitive elements 61 can be made of a photosensitive material, and a black matrix can be selected as the first light shield layer 7.

In some embodiments, step S3 further includes forming a thin-film transistor (TFT) driving layer (not shown) on the second substrate.

In other implementations, step S2 and step S3 can be performed simultaneously, or step S3 is first and step S2 is next, no limitation is made in the present disclosure.

Step S4: setting the first substrate 1 and the second substrate 2 in an opposite and aligned way, and forming a gap between the first transparent layer 51 and the first light shield layer 7.

Step S5: forming a liquid crystal layer in the gap.

Since the principle of this manufacturing method to solve the problem is similar to that of the display panel described above, the details will not be repeated.

Various embodiments of the present disclosure can have one or more of the following advantages.

The protrusions can be used as a convex lens, and the fingerprint detection light is refracted when passing through the protrusions, the angle between the refracted light and the optical axis is reduced, which is conducive to improving the collimation degree of the fingerprint detection light, and thus the effective light entering amount of the photosensitive elements is improved, thereby the quality of the fingerprint image is improved, and the success rate of fingerprint acquisition is raised.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A display panel, comprising:
a first substrate;
a second substrate disposed opposing the first substrate;
a first transparent layer;
a first light shield layer; and
a photosensitive element layer located between the first substrate and the second substrate;
wherein:
the first transparent layer, the first light shield layer, and the photosensitive element layer are sequentially disposed along a direction from the first substrate to the second substrate;
the first transparent layer includes a plurality of protrusions extending toward the first substrate;
the first light shield layer includes a plurality of first openings;
the photosensitive element layer includes a plurality of photosensitive elements for acquiring fingerprint images; and
the protrusions, the first openings, and the photosensitive elements have one-to-one correspondence, and have at least partially overlapped orthographic projections on the second substrate.

2. The display panel according to claim 1, wherein an orthographic projection of the protrusions on the second substrate is larger than an orthographic projection of the first openings on the second substrate, and covers an orthographic projection of the first openings on the second substrate.

3. The display panel according to claim 1, wherein an optical focus of the protrusions is located within the first openings.

4. The display panel according to claim 1, wherein:
the display panel comprises a second transparent layer disposed between the first substrate and the first transparent layer; and the second transparent layer is provided with a plurality of depressions, and the protrusions are located within the depressions.

5. The display panel according to claim 4, wherein a refractive index of the first transparent layer is greater than a refractive index of the second transparent layer.

6. The display panel according to claim 4, wherein:
the display panel comprises a second light shield layer disposed between the first substrate and the second transparent layer;
the second light shield layer is provided with a plurality of second openings; and
orthographic projections of the second openings, the protrusions, the first openings, and the photosensitive elements on the second substrate are at least partially overlapped.

7. The display panel according to claim 6, wherein:
the display panel comprises a color filter layer and a liquid crystal layer, and the filter layer is disposed between the second light shield layer and the second transparent layer; and
the liquid crystal layer is disposed between the first transparent layer and the first light shield layer.

8. The display panel according to claim 6, wherein:
the display panel comprises a color filter layer and a liquid crystal layer;
the filter layer is disposed between the second light shield layer and the second transparent layer; and
the liquid crystal layer is disposed between the first transparent layer and the color filter layer.

9. The display panel according to claim 6, wherein an orthographic projection of the second openings on the second substrate is not smaller than an orthographic projection of the protrusions on the second substrate, and covers an orthographic projection of the protrusions on the second substrate.

10. The display panel according to claim 7, wherein the first transparent layer is a photoresist layer, and the second transparent layer is a planarization layer.

11. A display screen, comprising a backlight module and the display panel according to claim 1, wherein the display panel covers the backlight module.

12. The display screen according to claim 11, wherein an orthographic projection of the protrusions on the second substrate is larger than an orthographic projection of the first openings on the second substrate, and covers an orthographic projection of the first openings on the second substrate.

13. The display screen according to claim 11, wherein an optical focus of the protrusions is located within the first openings.

14. The display screen according to claim 11, wherein the display panel comprises a second transparent layer disposed between the first substrate and the first transparent layer, the second transparent layer is provided with a plurality of depressions, and the protrusions are located within the depressions.

15. The display screen according to claim 14, wherein a refractive index of the first transparent layer is greater than a refractive index of the second transparent layer.

16. The display panel according to claim 14, wherein the display panel comprises a second light shield layer disposed between the first substrate and the second transparent layer, the second light shield layer is provided with a plurality of second openings, orthographic projections of the second openings, the protrusions, the first openings, and the photosensitive elements on the second substrate are at least partially overlapped.

17. A terminal device, comprising the display screen according to claim 11.

18. A manufacturing method of a display panel, comprising:
providing a first substrate and a second substrate;
forming sequentially a second light shield layer, a color filter layer, a second transparent layer, and a first transparent layer on a side of the first substrate close to the second substrate;
forming sequentially a photosensitive element layer and a first light shield layer on a side of the second substrate close to the first substrate;
setting the first substrate and the second substrate in an opposite and aligned way, and forming a gap between the first transparent layer and the first light shield layer; and
disposing a liquid crystal layer in the gap;
wherein the first transparent layer includes a plurality of protrusions extending toward the first light shield layer, the first light shield layer includes a plurality of first openings, the photosensitive element layer includes a plurality of photosensitive elements; projections of the protrusions, the first openings, and the photosensitive elements on the second substrate are at least partially overlapped.

19. The manufacturing method according to claim 18, wherein the second transparent layer is a photoresist layer, and the second transparent layer is formed through masking by a gray tone mask plate.

20. A mobile terminal comprising the display panel of claim 1, wherein the protrusions are configured as convex lenses to refract the fingerprint detection, to thereby reduce an angle between the refracted light and an optical axis of the display panel, improve collimation of the fingerprint detection light and success rate of fingerprint acquisition.

* * * * *